United States Patent [19]

Welsch et al.

[11] Patent Number: 5,430,753

[45] Date of Patent: Jul. 4, 1995

[54] STRIPLINE LASER HAVING COMPOSITE ELECTRODES

[75] Inventors: Wolfgang Welsch, Baldham; Hans Krueger, Munich; Peter Mammach, Unterhaching; Klemens Huebner, Ottobrunn; Karlheinz Arndt, Munich, all of Germany

[73] Assignee: Siemens Aktiengesellschaft, Munich, Germany

[21] Appl. No.: 115,413

[22] Filed: Aug. 31, 1993

[30] Foreign Application Priority Data

Aug. 31, 1992 [EP] European Pat. Off. ............ 92114862

[51] Int. Cl.⁶ .............................................. H01S 3/097
[52] U.S. Cl. ........................................ 372/87; 372/35; 372/64
[58] Field of Search ..................... 372/87, 61, 35, 64

[56] References Cited

U.S. PATENT DOCUMENTS

| | | | |
|---|---|---|---|
| 4,719,639 | 1/1988 | Tulip. | |
| 4,939,738 | 7/1990 | Opower. | |
| 5,123,028 | 6/1992 | Hobart et al. | 372/64 |
| 5,197,079 | 3/1993 | Krueger et al. | 372/87 |
| 5,220,576 | 6/1993 | Krueger et al. | 372/87 |
| 5,231,644 | 7/1993 | Krueger et al. | 372/87 |

FOREIGN PATENT DOCUMENTS

| | | |
|---|---|---|
| 0305893 | 3/1989 | European Pat. Off. . |
| 0477864 | 4/1992 | European Pat. Off. . |
| 0477865 | 4/1992 | European Pat. Off. . |
| WO89/00350 | 1/1989 | WIPO . |

OTHER PUBLICATIONS

"Diffusion-cooled Compact $CO_2$ High Power Lasers", Laser und Optoelektronik, vol. 23(3), 1991, pp. 68–82.
"Waveguide $CO_2$ laser with high-frequency excitation", Soviet Journal of Quantum Electronics, vol. 11 (1981) May, No. 5 pp. 666–668.

Primary Examiner—Léon Scott, Jr.
Attorney, Agent, or Firm—Hill, Steadman & Simpson

[57] ABSTRACT

In a stripline laser, each electrode is fashioned as a composite of a carrier part having a mechanically stable profile and a plate-shaped electrode part having integrated cooling that is hard-soldered or welded thereto and faces toward the discharge gap.

23 Claims, 3 Drawing Sheets

STRIPLINE LASER HAVING COMPOSITE ELECTRODES

BACKGROUND OF THE INVENTION

1. Field of the Invention

The present invention is directed generally to a stripline laser and, more particularly, to a radio-frequency-excited diffusion-cooled stripline laser having two metal electrodes provided with cooling channels that are fixed to form a discharge gap between the electrodes, whereby the electrodes have waveguide surfaces facing toward the discharge gap, and the width thereof is a multiple of their spacing, and further having resonator mirrors that form an unstable resonator.

2. Description of the Related Art

European Published Application 0 477 865 discloses a stripline laser of the type described in the foregoing.

Up to a few years ago, insurmountable difficulties opposed the design of compact, high-power $CO_2$ lasers. Due to the physical processes in the laser excitation, the efficiency of the lasers is highly dependent on the temperature of the gas not becoming excessively high, i.e. on an effective elimination of excess heat from the laser gas during its operation. It has been shown in diffusion-cooled $CO_2$ lasers, wherein the heat is carried away by a stationary thermal conduction process from the hottest location in the center of the laser plasma to the cooled walls of the discharge vessel, that the laser output power is only dependent on the length and not on the diameter of the discharge. As a result, complicated convolution structures were developed, on the one hand, to retain the compact dimensions of the laser despite a power output extending into the kW range. On the other hand, quickly flooded, i.e., convection-cooled, lasers were developed. Quickly flooded lasers in the power category 500 through more than 10,000 Watts are currently commercially available. These lasers, which are not constructed for sealed-off operation, however, are bulky, have a high power-specific weight, and are dependent on a costly external gas supply and on pumping for fast gas circulation.

For these reasons, the only compact, diffusion-cooled $CO_2$ lasers available have been lasers of the type referred to as waveguide lasers that have powers up to 200 Watts.

The fundamental principles of a stripline laser are disclosed in European Published Application 0 305 893 in which the discharge space thereof is not of a quadratic cross-section—by contrast to waveguide lasers—but instead is shaped based on planar waveguide structures that are open toward the side. The combination of such a quasi-one-dimensional waveguide with an unstable resonator in the orthogonal direction thereby results in a diffraction-limited fundamental mode laser emission. In the stripline laser, heat is absorbed over a large area by closely adjacent electrodes, from which the heat is then eliminated with the assistance of suitable cooling liquids. It is, therefore, not necessary to pump the laser gas itself through the discharge space with a special cooling circulation means.

The article by R. Nowack et al., "Diffusionsgekühlte $CO_2$-Hochleistungs-laser in Kompaktbauweise", in "Laser und Optoelektronik", 23 (3)/1991, sets out the state of the art in stripline laser technology. Up to now, considerable difficulties have opposed the conversion of the above-described stripline laser concept into a practical design. The selection of a suitable electrode material has proved especially problematical. The electrodes, on the one hand, serve to input the radio-frequency energy, in other words, the electrodes carry high currents. Moreover, they should form an optimally loss-free optical waveguide and eliminate the heat as well. Over and above this, only component parts and materials which are at an equilibrium state in the gas mix in the laser and which are stable over the long term are suitable. For example, the anticipated and undesirably high $CO_2$ decomposition due to the presence of copper electrodes is discussed in the article. Further demands which have been made of the structure of cooled electrodes is to provide means for mutual spacing of the electrodes, optimize of the weight of the laser, provide adequate stability with respect to mechanical and thermal stresses, and, last but not least, to provide for relatively low cost manufacturing of the laser.

The initially cited European Published Application 0 477 865 discloses a stripline laser with solid electrodes wherein cooling channels are introduced in the form of oblong holes. For achieving higher powers, this laser can only theoretically be varied in length and in breadth without further ado. In fact, processing with the necessary precision the large planar surfaces that are then required presents considerable difficulties. Moreover, such large surfaces are not adequately stable in shape, so that the waveguide properties are lost.

SUMMARY OF THE INVENTION

An object of the present invention is to provide a laser a radio-frequency-excited diffusion-cooled stripline laser having two metal electrodes provided with cooling channels that are fixed to form a discharge gap between the electrodes, whereby the electrodes have waveguide surfaces facing toward the discharge gap, and the width thereof is a multiple of their spacing, and further having resonator mirrors that form an unstable resonator with which the above-described disadvantages are largely avoided without great design outlay and, in particular, with which a compromise between good cooling of the laser gas, low waveguide losses and the possibility of stable behavior over the long term (approximately 10,000 operating hours) in a sealed-off operation can be achieved.

This and other objects and advantages are inventively achieved in a stripline laser of the type set out above in that each electrode is a composite of a carrier part having a mechanically stable profile shape and of a plate-shaped electrode part providing integrated cooling that is hard-soldered or welded to the carrier part and that faces toward the discharge gap.

Further developments of the invention include shaping the carrier part of the composite electrode as an at least U-shape and preferably as an approximately rectangular cross-section having a hollow interior. Additionally, the electrode part has cooling channels that are open toward the carrier part. The electrode part of a preferred embodiment is essentially of copper and the carrier part is essentially of stainless steel.

Desirable advantages are provided by the corner edges of the electrode parts being slightly offset relative to one another. Further, the corner edges of the electrodes are at optimized radii of curvature. A metallic coating is applied to the waveguide surfaces of the electrode parts in an exemplary embodiment.

As a further development, metallic laminae or angles are secured to the two carrier parts and ceramic spacers are secured to the laminae or angles to connect the two composite electrodes to one another at a spacing which remains constant independently of temperature. The laminae or angles and at least two surrounding parts of the spacer are preferably affixed, such as by a screw, to one another under stress, such as under pressure.

In the stripline laser, cooling water is pumped in parallel into each electrode part through two middle cooling channels lying side-by-side and is in turn returned through respective cooling channels arranged at the left and right outside of the electrode. A copper adaptor is arranged between the electrode part and the appertaining carrier part of each of the two composite electrodes. Cooling channels that, in particular, are provided for receiving the cooling water are provided in the copper adaptor. In addition, a cavity or a subspace particularly for receiving the cooling water is provided in each carrier part of the composite electrodes.

The spacers are preferably arranged laterally of the electrodes outside the maximum amplitude of resonant oscillations occurring in the stripline laser during its operation and the electrodes are preferably provided with bores, or openings, at the locations of pressure inhomogeneities resulting from operation of the laser.

DETAILED DESCRIPTION OF THE PREFERRED EMBODIMENTS

A $CO_2$ laser, which is shown in a corresponding application filed simultaneously herewith and which is incorporated by reference herein, includes a resonator having mirrors at either end of a discharge gap that is filled with carbon dioxide gas and that is defined by a pair of electrodes that carry excitation energy to the gas for generating a plasma which results in the generation of the laser beam.

Figure 1:
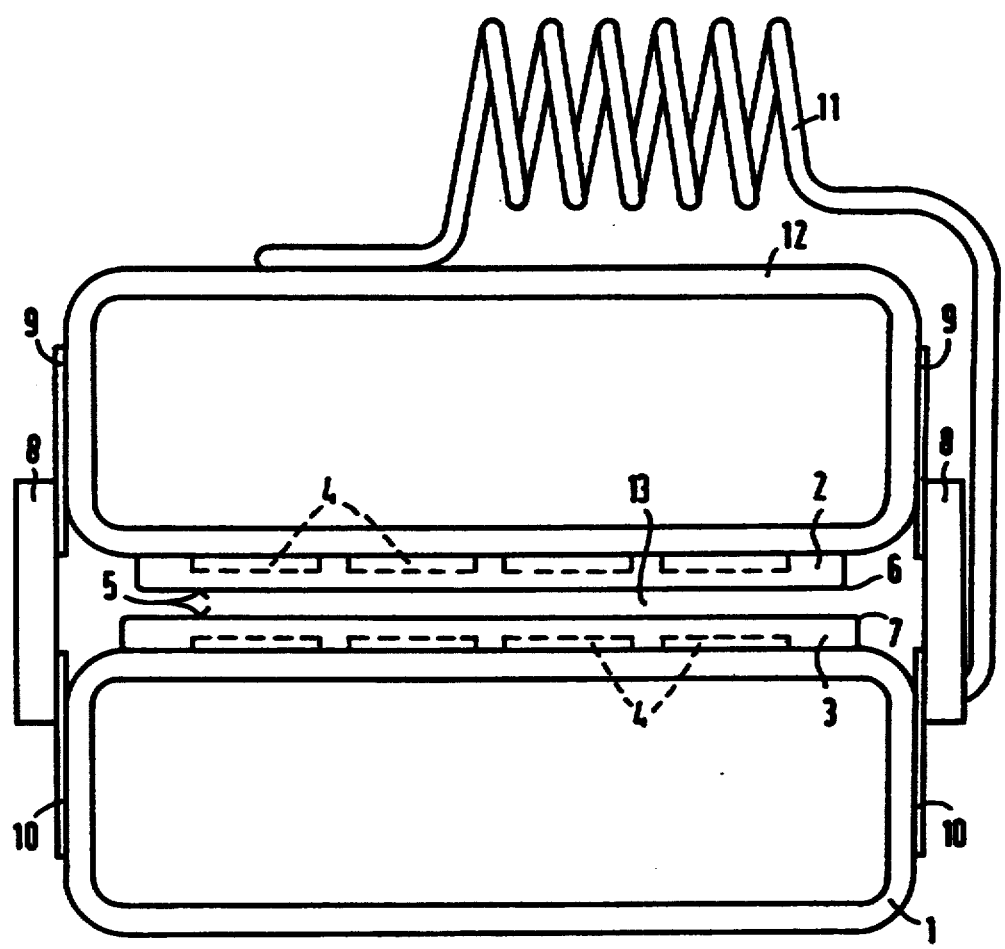
FIG. 1 is a schematic illustration in cross section of an embodiment of a composite electrode pair according to the principles of the invention.

FIG. 1 of the present application shows an electrode pair according to the invention, including a lower composite electrode, elements 1 and 3, and an upper composite electrode, elements 2 and 12, that are separated by a discharge gap 13. Each of the two composite electrodes is formed of a carrier 10 and 12 and an electrode 1 and 2, respectively. In the illustrated exemplary embodiment, the two carrier parts 1 and 12 are in the shape of hollow profiles, or hollow bodies, having an approximately rectangular cross-section and are composed of V2A Steel.

Not only may the carriers be the hollow profiles shown, but U-shaped profiles are also fundamentally suitable, although U-shaped members have less stiffness and therefore result in less stability for the laser emission. The stiffness of U-shaped carriers can be enhanced, however, by adding longitudinal reinforcements. It is also possible that the illustrated rectangular carriers can be further reinforced by additional transverse reinforcements (not shown).

In FIG. 1, nearly identical electrode parts 2 and 3—which need not absolutely be rectangularly shaped in every case depending on the resonator type—are firmly joined by hard-soldering at more than 700° C. to the surfaces of the carrier parts 1 and 12, respectively, that face toward the discharge gap 13. A deformation-free structural format is facilitated by the use of hard solder, which may be used for all connections in the selected structure since it has a tensile strength that is four to five times higher than soft solder. Moreover, hard solder is considerably denser than soft solder, which may add to the service life of the laser system. Above all, hard solder is also substantially more temperature-stable and withstands baking at approximately 400° C., which is required for removing residual gases from the laser, the baking time being substantially shortened as result thereof and the service life being substantially lengthened.

V2A Steel as used for the carrier parts is non-magnetic, can be easily combined with copper and—over and above this—has approximately the same coefficient of thermal expansion as copper. Cooling channels 4 that are open at the back side, i.e. toward the carrier parts 12 and 1, respectively, are milled into the copper electrode parts 2 and 3. Fundamentally, cooling coils can also be provided on the surfaces of two carrier parts 1 and 12 that face away from the discharge gap 13. The illustrated embodiment, however, is distinguished by an especially effective and uniform cooling.

The large-area electrode parts 2 and 3—which, together with the carrier parts 12 and 1, can also be fashioned in segments each have a typical length of between 300 to 700 mm depending on the laser power and on a length/width ratio of approximately 6:1. The electrode parts 2 and 3 are mounted opposite one another at a spacing of between approximately 1.4 to 1.7 mm. In the exemplary embodiment of FIG. 1, their spacing amounts to 1.68 mm and, similar to the stainless steel carrier parts 1 and 12, they are approximately 2 mm thick. The electrode parts 2 and 3 fashioned as rectangular copper plates that adjoin the plasma and form waveguide surfaces 5 thereat can either be burnished or ground smooth with diamonds in a relatively simple way, so that the laser modes propagate practically unattenuated in the stripline laser. The electrode parts are distinguished by especially good thermal conductivity properties and by low optical losses. It is also possible without further ado to metallically coat the waveguide surfaces 5, for example to electroplate them with gold, such that they additionally provide a catalytic function that enhances the efficiency of the laser. A Ni barrier layer and a Au layer lying thereabove, each of which can be approximately 0.1 μm thick, applied in a vapor-deposition process is also contemplated as a coating.

In order to counteract fabrication-related tolerance variations, it is advantageous to arrange the electrode parts 2 and 3 having slightly different widths (approximately 1 mm difference) above one another so that corner edges 6 and 7 are slightly offset relative to one another. So that the efficiency of the laser is not substantially deteriorated, it is advantageous over and above this to optimize the radii of curvature of the corner edges 6 and 7, i.e. to keep the radii optimally small. Investigations of the field strength exaltation have shown that the radius of curvature must be greater than approximately 0.5 for an exaltation factor of less than 1.5.

The discharge volume of the laser is excited with RF (radio frequency) energy at between 83 to 125 MHz. Commercially available RF generators having a 2.5 kW cw power and a 6 kW super pulse power can be used. The impedance of the generator must thereby be transformed to that of the stripline with a matching circuit. FIG. 1 indicates coils 11 between the stripline electrodes, which equalize the voltage distribution between the electrodes in a known way to such an extent that uniform burning of one RF plasma is assured. The vacuum-tight encapsulation of the electrode arrangement in a preferably cylindrical steel housing cooled from the outside whose face plates or, respectively, whose resonator mirrors are kept constant in spacing by, for example, cooled Invar rods and which, of course, are necessary for the laser operation are not shown in FIG. 1 of the present application but are shown in the simultaneously filed co-pending application. Various measures are necessary in order to prevent a migration of the resonator mirrors due to heating and to assure the mechanical stability of the entire structural laser format vis-a-vis temperature stresses. To that end, co-pending U.S. application corresponding to the afore-mentioned European Published Application 0 477 865 and European Patent Application No. 92114861.5 bearing the title "Stripline Laser Resonator" which was filed on the same day as the instant application are referenced thereto, the latter being herewith incorporated into the disclosure.

FIG. 1 shows spacers 8 that are preferably composed of $Al_2O_3$ ceramic and that insulate the composite electrode pair from one another and are intended to keep them at a constant, temperature-independent spacing from one another. They are respectively secured to laminae 9 and 10 of special alloys such as Invar or Kovar, preferably by soldering with a CuAu alloy, whereby the laminae 9 and 10 are in turn screwed, soldered or welded to the carrier parts 1 and 12.

Examination results are taken into consideration in this structural design in accord wherewith the spacers are exposed to the greatest forces and thermal stresses during the heating-up phase shortly after the laser is placed in operation. A safety margin of approximately 4 with respect to the stresses is inventively achieved even given an operating temperature initially of only 10° C. and a cooling water temperature of 20° through 25° C. The exact spacing of the stripline electrodes is a critical prerequisite for the beam stability and, thus, for the quality of the beam as well. Undesired asymmetrical mechanical or thermal stressing of the cuboid-shaped $Al_2O_3$ spacers 8 whose shape, however, can still be improved—as is set forth farther below—can also be reduced in that the spacers are shielded from the hot plasma by an additional ceramic cladding. In those instances wherein a material such as Zerodur [Trademark] or Vakodil [Trademark] is advantageously used for the spacers, this having only an extremely slight or absolutely no length dilation, one must insure electrical insulation of the parts, for example by providing a ceramic cladding. Over and above this, it is inventively proposed to bend the laminae 9 and 10 once or twice nearly at a right angle relative to the respective carrier part to which they are secured and to thus secure the spacers 8 to the laminae 9 and 10 angled off in this way. This is especially advantageous because the hollow profiles of the carrier members 1 and 12 have a manufacturing tolerance of approximately 0.3 mm. Overall, the connection of two merely identical composite electrodes with the described spacers yields a freedom from warping even given variation of the power between 10 and 100% that corresponds to approximately 1 through 10 W/cm² thermal load on the electrode surface.

Figure 2:
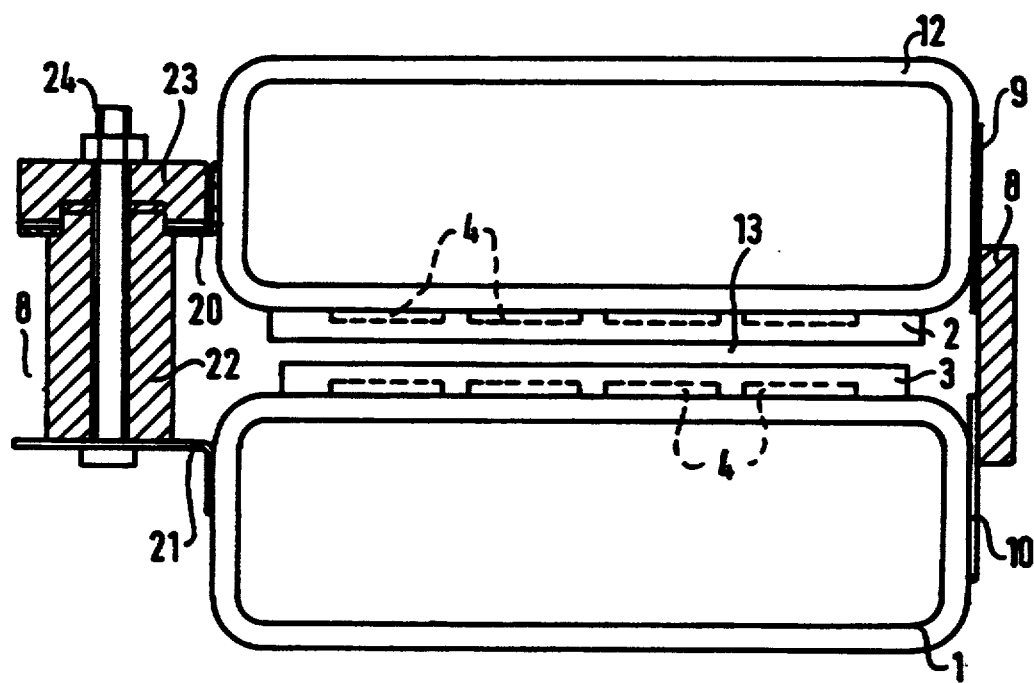
FIG. 2 is a cross section of the composite electrode pair having another embodiment of a spacer according to the invention.

FIG. 2 shows an especially advantageous embodiment of a spacer 8. This is composed of two holding angles 20 and 21 and of a plurality of ceramic parts 22, 23 that are firmly screwed to one another. For example, a ceramic spherical button screw 24 can be employed for that purpose. The holding angles 20, 21 are welded to the carrier parts 12, 1 and (not shown in FIG. 2) can also be reinforced diagonally relative thereto. As a result of the screw fastening, the ceramic parts 22, 23 are under a mechanical pre-stress, or pressure, as a result whereof the spacer 8 fashioned in this way withstands more tensile of force than it would be capable of without the pressing power of the screw 24.

It has proven inventively beneficial in the embodiment of the cooling channels to allow the cooling water to simultaneously enter in parallel in the two middle cooling channels 4 given the respectively four cooling channels 4 in each electrode part 2 and 3 shown in FIG. 1 and to return the cooling water at the left and right outside cooling channels. However, there is also the possibility to provide a copper adaptor 14 with cooling channels between the electrode parts 2 and 3 and the appertaining carrier part 12 and 1.

Figure 3:
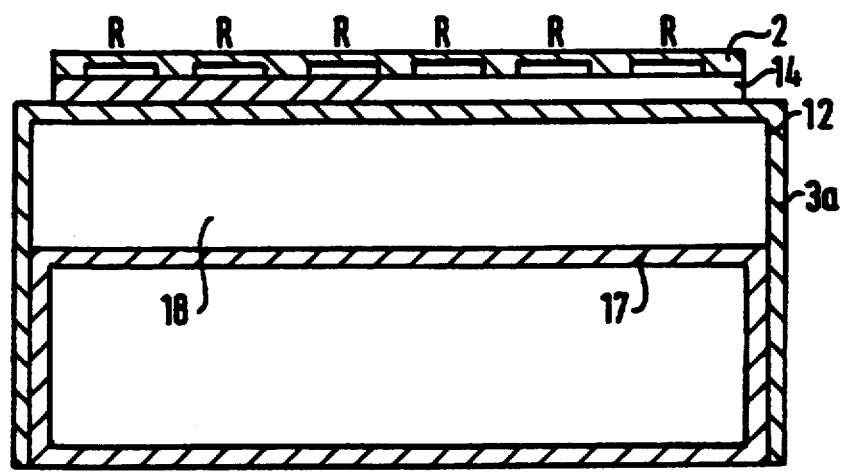
FIGS. 3a, 3b, and 3c are cross sections of various embodiments of composite electrodes having improved cooling channels.
Figure 3B:
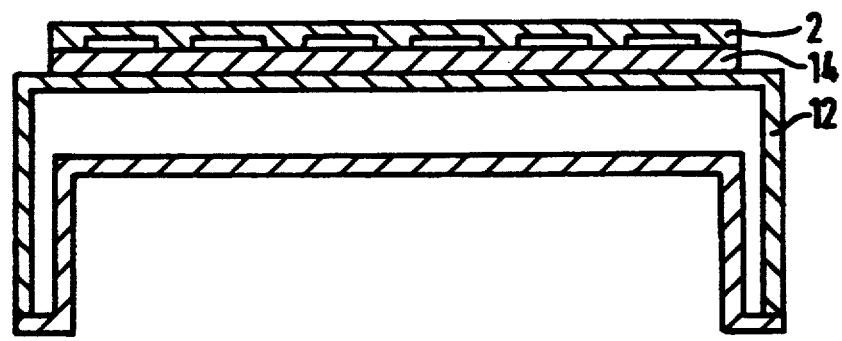
Figure 3C:
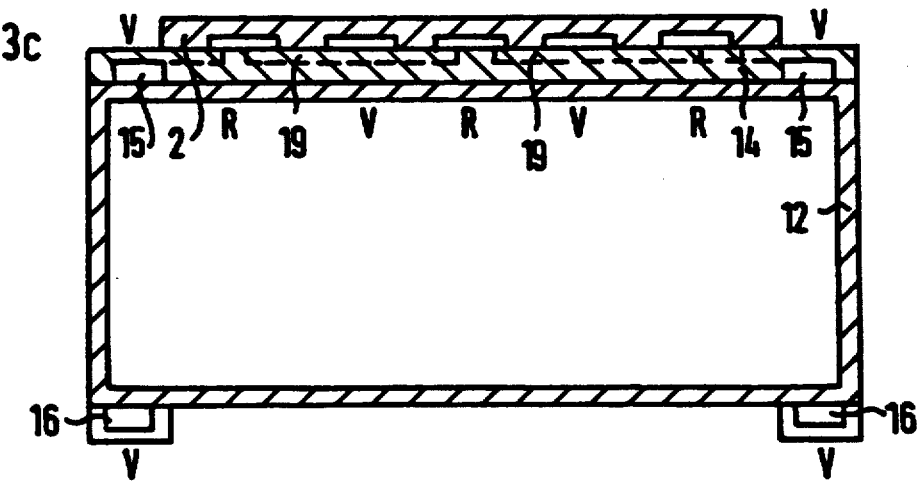

As shown in FIG. 3c, for example, cooling channels 15 can be provided in the copper adaptor 14, these cooling channels 15 being used to receive the coolant, whereas the cooling channels in the actual electrode part 2, 3 serve to receive and return in alternation. Cooling channels 16 can also be provided at the underside of the carrier part 12.

As shown in FIG. 3a, finally, it also lies within the scope of the Invention to subdivide the rectangular carrier part 12 that carries the copper adaptor 14 and the electrode part 2 by a longitudinal wall 17 and to have the cooling water advance take place in the subspace 18 that is created in this way and faces toward the electrode part 2. All of the cooling channels in the electrode part serve for the return in this case.

FIG. 3b shows another possible embodiment. What is ultimately decisive for all of the embodiments of the cooling water carrying electrodes of the invention is that a mechanically stable condition of the stripline channel be reached as quickly as possible, even given a fast switching of the laser power that is accompanied by a modified thermal flow to the electrodes. A particular advantage of the embodiment shown in FIGS. 3a–3c is comprised therein that the carrier part 12 is constantly held at the flow temperature of the cooling water in all stages, which would otherwise not be guaranteed despite the cooling of the electrode part 2 that is immediately exposed to the plasma. A distortion of the rectangular profile is thus prevented.

It was found during further investigations of the laser system of the invention that acoustic resonant oscillations are excited at discrete pulse frequencies and that these can only be avoided by a suitable arrangement of the spacers and by further measures that are compatible with the structural format which has been set forth. At every ignition of the plasma, it greatly expands at the frequency of the pulse repetition rate as a consequence of the heating. The resonant oscillations lead to inhomogeneities of pressure in the stripline laser, particularly at the locations of the spacers, which, beyond their immediate consequences, can also lead to a great gas decomposition or, respectively, to arcing. It has proven inventively beneficial in this context to not arrange the spacers at the locations of the maximum amplitudes but to provide bores in the electrodes there that serve the purpose of pressure equalization. In order to avoid refractive edges, the spaces can also be of a cylindrical or oval shape instead of being cuboid. Transverse grooves 19 that serve the purpose of pressure equalization are indicated in FIG. 3c and these can be bored without further ado in the selected structure by bores fitting between the cooling channels through the metal parts lying thereabove.

Although other modifications and changes may be suggested by those skilled in the art, it is the intention of the inventors to embody within the patent warranted hereon all changes and modifications as reasonably and properly come within the scope of their contribution to the art.

We claim:

1. Electrodes for a radio-frequency-excited, diffusion-cooled stripline laser, comprising:
   first and second metal electrodes each being composites including:
      an electrode part defining cooling channels, said electrode part having a waveguide surface, said electrode part being substantially plate shaped, and
      a carrier part having a mechanically stable profile shape, said carrier part being hard soldered and welded to said plate shaped electrode; and
      means for fixing said first and second metal electrodes relative to one another with said waveguide surfaces facing one another to define a discharge gap between said waveguide surfaces.

2. Electrodes as claimed in claim 1, wherein said first and second metal electrodes are welded to respective ones of said first and second carrier parts.

3. Electrodes as claimed in claim 1, wherein said first and second metal electrodes are connected to respective ones of said first and second carrier parts by hard solder.

4. Electrodes as claimed in claim 1, wherein said means for fixing fixes said waveguide surfaces at a mutual spacing corresponding to a fraction of widths of said waveguide surfaces.

5. Electrodes as claimed in claim 1, wherein said first and second carrier parts are each of a U-shaped cross section.

6. Electrodes a claimed in claim 1, wherein said first and second carrier parts are each of a substantially rectangular cross section having a hollow interior.

7. Electrodes as claimed in claim 1, wherein said first and second metal electrodes have portions defining cooling channels that are open toward respective ones of said first and second carrier parts.

8. Electrodes as claimed in claim 1, wherein said first and second metal electrodes consist essentially of copper.

9. Electrodes as claimed in claim 1, wherein said first and second carrier parts consist essentially of stainless steel.

10. Electrodes as claimed in claim 1, wherein said means for fixing fixes said waveguide surfaces so that corner edges thereof are offset from one another.

11. Electrodes as claimed in claim 1, wherein said first and second metal electrodes have corner edges shaped along radii of curvature.

12. Electrodes as claimed in claim 1, further comprising:
   a metallic coating on said waveguide surfaces.

13. Electrodes as claimed in claim 1, wherein said means for fixing includes:
   metallic members connected to said first and second carrier parts; and
   at least one ceramic spacer connected to said metallic members to connect said first and second carrier parts to one another at a spacing that is substantially independent of temperature.

14. Electrodes as claimed in claim 13, wherein said metallic members are laminae.

15. Electrodes as claimed in claim 13, wherein said metallic members are angles.

16. Electrodes as claimed in claim 13, wherein said at least one ceramic spacer comprises two ceramic spacers, and further comprising:
   means for affixing said two ceramic spacers to one another under pressure.

17. Electrodes as claimed in claim 13, wherein said at least one ceramic spacer is fixed outside a maximum amplitude of resonant oscillations during operation of said stripline laser, and
   said first and second metallic electrodes defining forces at locations of pressure inhomogeneities during operation of said stripline laser.

18. Electrodes as claimed in claim 1, wherein said first and second metal electrodes have portions defining two middle cooling channels side-by-side and two outside cooling channels, one of said outside cooling channels being one either side of said two middle cooling channels, and further comprising:
   means for pumping cooling fluid through said cooling channels so that the cooling fluid enters through said two middle cooling channels and returns through said two outside cooling channels.

19. Electrodes as claimed in claim 1, further comprising:
   an adapter member between each of said first and second metal electrodes and respective ones of said first and second carrier parts.

20. Electrodes as claimed in claim 19, wherein said adaptor member consists essentially of copper.

21. Electrodes as claimed in claim 19, wherein said adaptor member includes portions defining cooling channels for carrying cooling fluid.

22. Electrodes as claimed in claim 1, wherein said first an second carrier parts are hollow, and further comprising:
   means in said first and second carrier parts for dividing interior spaces of said carrier parts into sub-spaces, one of said sub-spaces being capable of carrying a flow of cooling fluid.

23. A pair of electrodes for a stripline laser, comprising:
   first and second composite electrodes each including:
      an electrode plate having a substantially planar waveguide surface and a surface opposite said waveguide surface defining a plurality of cooling channels, and
      a carrier part having a mechanically stable profile shape, said carrier part being one hard soldered and welded to said plate shaded electrode; and
   ceramic spacers connected to said first and second metal electrodes to fix said first and second metal electrodes relative to one another with said waveguide surfaces facing one another to define a discharge gap between said waveguide surfaces.

* * * * *